United States Patent [19]
Dunn

[11] 3,874,970
[45] Apr. 1, 1975

[54] METHOD AND APPARATUS FOR PRODUCING FLATTENED FLEXIBLE TUBE STOCK

[75] Inventor: John William Dunn, Sylvania, Ohio

[73] Assignee: Owens-Corning Fiberglas Corporation, Toledo, Ohio

[22] Filed: Feb. 3, 1972

[21] Appl. No.: 223,165

[52] U.S. Cl.............. 156/169, 156/171, 156/173, 156/175, 156/184, 156/190, 156/191, 156/194, 156/195, 156/429, 156/432, 156/446
[51] Int. Cl............................................ B65h 81/00
[58] Field of Search ............ 156/166, 173, 184, 190, 156/191, 194, 195, 294, 429, 431, 432, 446, 171, 175, 198, 212; 260/40 R, , 75 UA; 161/195

[56] References Cited
UNITED STATES PATENTS

| | | | |
|---|---|---|---|
| 2,760,549 | 8/1956 | Nash et al. | 156/432 |
| 2,803,056 | 8/1957 | Brissey, Jr. et al. | 156/294 |
| 2,852,840 | 9/1958 | Harvey | 156/194 |
| 2,938,566 | 5/1960 | Toulmin | 156/431 |
| 3,230,129 | 1/1966 | Kelley | 156/294 |
| 3,390,205 | 6/1968 | Schnell et al. | 260/75 UA |
| 3,399,095 | 8/1968 | Hyland, Jr. | 156/500 |
| 3,431,320 | 3/1969 | Baum et al. | 260/40 R |
| 3,464,879 | 9/1969 | Poulsen | 156/429 |
| 3,520,749 | 7/1970 | Rubenstein | 156/173 |
| 3,637,911 | 1/1972 | Baum et al. | 161/195 |
| 3,705,070 | 12/1972 | Kim | 156/173 |
| 3,740,294 | 6/1973 | Wienand et al. | 156/429 |

*Primary Examiner*—Daniel J. Fritsch
*Attorney, Agent, or Firm*—Carl G. Staelin; John W. Overman; William P. Hickey

[57] ABSTRACT

A method and apparatus for producing a tubular uncured shell of glass fiber reinforced resin by depositing the fibers and resins on a mandrel surface and removing the shell axially from the mandrel. The shell after moving off of the cylindrical mandrel is collapsed between rollers, and wound into a roll mounted transversely of the axis of the mandrel. In those instances where the surface of the mandrel revolves, the roll of flattened tubular materials is revolved with the mandrel at substantially the same speed. Periodically the tubular flattened material is cut, the roll removed, and a new roll started.

10 Claims, 5 Drawing Figures

METHOD AND APPARATUS FOR PRODUCING FLATTENED FLEXIBLE TUBE STOCK

BACKGROUND OF THE INVENTION

It has been known heretofore to produce cylindrical shells of glass fiber reinforced plastics by depositing the resin and plastic on a cylindrically shaped mandrel. In some instances the mandrel has been a revolving tapered form from which the part has been slid axially; and in another, the surface of the mandrel has been formed by an axially advancing coiled ribbon which recedes from the shell as the shell is formed continuously. In both processes, the resin has been cured on the mandrel into an inflexible generally cylindrical shape.

An object of the present invention is the provision of a new and improved method which can be used to make shells of non-cylindrical shape, as for example, a generally square shape useful for cargo carriers, and the like. It is impractical to produce such shapes on a mandrel of square cross section since materials wrapped thereon would be pulled at a nonuniform rate.

Other objects and advantages of the invention will become apparent to those skilled in the art to which the invention relates after reading the following description of applicant's preferred embodiments.

DESCRIPTION OF THE PREFERRED EMBODIMENTS

According to the invention, resin and glass fibers are deposited onto a cylindrical mandrel with a separation film between the mandrel and the resin. The separation film, resin and fibers, form an envelope which is moved axially off of the mandrel where it is flattened into a collapsed condition. According to further aspects of the invention, the envelope comprising the separation sheet and layer of resin and fibers is constructed to provide "green" strength longitudinally of the mandrel prior to the time that the envelope is removed from the mandrel. By novel treatment, this strength can be provided either by the separation film, or by the glass fiber reinforcement that is embedded in the resin, so that the envelope will not stretch longitudinally and will have desirable handling characteristics prior to and after removal from the mandrel. The resin can be a thermoplastic resin or a thermosetting resin. Also according to the invention, in those instances where the resin is a thermosetting resin, the resin is caused to harden in two stages. In the first stage of hardening, the molecules of the resin are linked linearly to have strength and yet be flexible either prior to or during storage after removal from the mandrel. This first stage of hardening will be similar to a B-staged phenol formaldehyde resin. After removal from the roll, the material is shaped and subjected to heat to convert the resin into a thermoset, rigid, condition.

Figure 1:
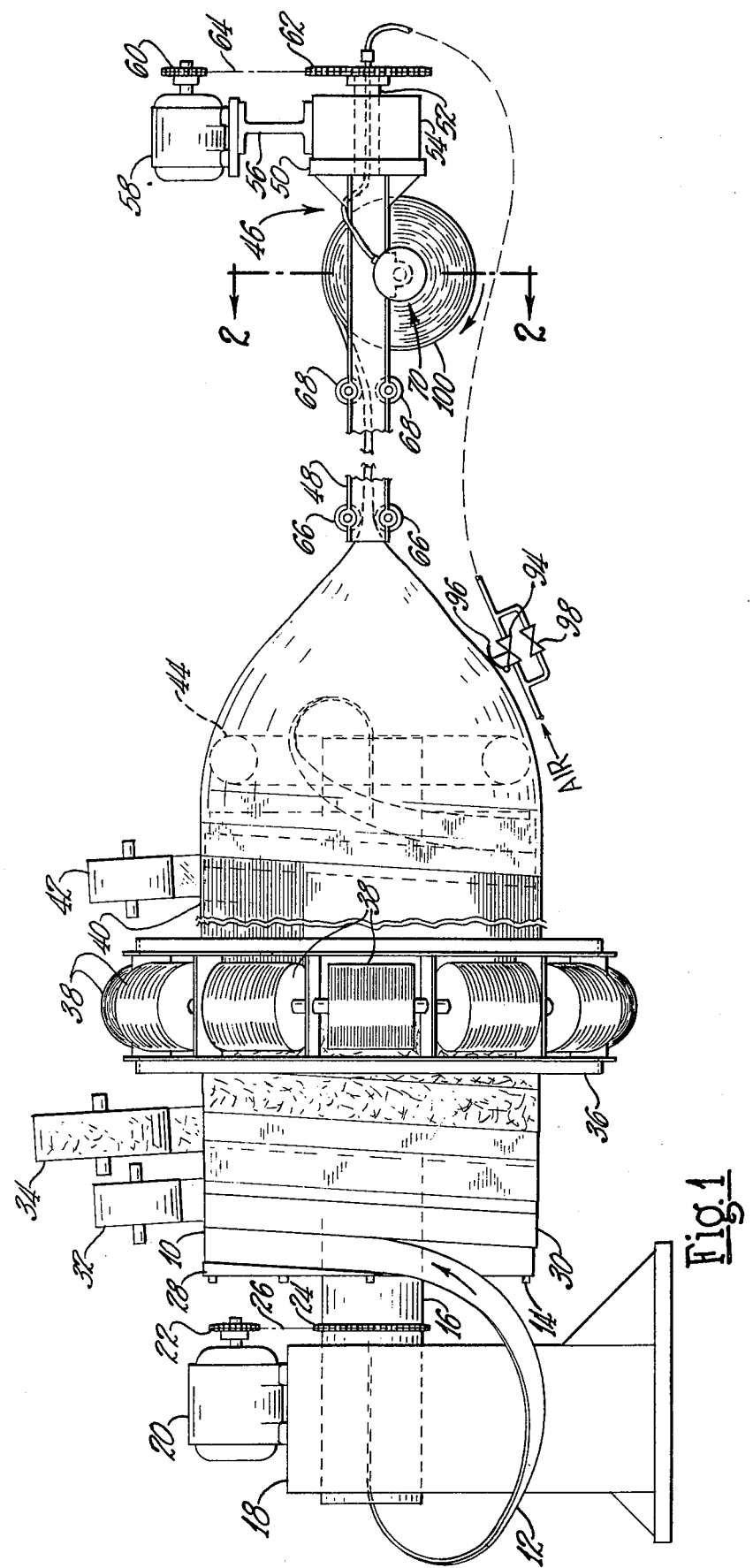
FIG. 1 is a schematic elevational view of one embodiment of apparatus for performing the present invention.
Figure 3:
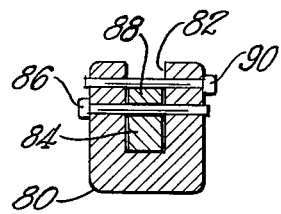
FIG. 3 is an enlarged sectional view taken approximately on the line 3—3 of FIG. 2.

While the invention may be otherwise embodied, it is shown in FIG. 1 of the drawings as embodied in apparatus having a mandrel surface which is both revolved and which moves axially as it revolves. The apparatus shown in FIG. 1 generally comprises a cylindrical mandrel or collection surface 10 that is formed by an endless band 12 that is coiled around a squirrel cage support 14 therefor. The squirrel cage support is in turn cantilevered from a large rotatable shaft 16 that is in turn journaled by a large pedestal support 18. The shaft 16 is rotated by means of the motor 20 through sprockets 22 and 24, and drive chain 26. The endless band 12 is fed onto the squirrel cage 14 between a pie shaped cam 28 and its previous coil 30, such that the cam 28 slides the coils endwise over the squirrel cage 14 to provide a cylindrical surface. When the coils 30 reach the other end of the squirrel cage 14, they are uncoiled over suitable rollers not shown, and fed back through the tubular shaft 16 to the feed end of the machine where it is again fed back onto the squirrel cage 14.

Cylindrical shells of predetermined wall thickness are formed by wrapping a separation sheet 32, as for example cellophane having a contact adhesive along the trailing outer side edge thereof. The contact adhesive is applied so that it faces outwardly from the mandrel 10, so that when each coil of the separation film is pulled down over the top of the previous coil of separation film, the coils are bonded together. Thereafter a plurality of layers of liquid resin impregnated glass fiber mat 34 are wrapped over the separation sheet. In some instances a band of continuous glass fiber strands are wrapped over the coils of mat 34 to hold the same in place and provide additional reinforcement.

In the preferred embodiment of the invention, the resin which is used is compounded so that it will harden in two stages, the first of which is similar to a B-staged phenol formaldehyde in that its molecules become linked linearly to a flexible solid state which can later be changed into a thermoset condition. One such material may have the following composition:

| Materials | Desirable % by Wt. | Preferred % by Wt. |
|---|---|---|
| UNSATURATED POLYESTER RESIN | 25–95 | |
| 1 mole phthalic anhydride, 1 mole maleic anhydride, 2 moles propylene glycol cooked to an acid number of 30–35 | | 42.7 |
| CATALYST FOR CROSSLINKING DOUBLE BONDS | 0.1–5 | |
| Dicumyl peroxide | | 0.85 |
| 2,5-dimethyl hexyl-2,5-di (peroxybenzoate) | 0.09 | |
| SOLVENT | optional | |
| Styrene | | 4.27 |
| GELLING AGENT (Alkaline Earth Metal) | 0.2–10 | |
| Oxide) | | |
| Ca(OH)$_2$ | | 1.28 |
| FILLERS | 0–75 | |
| Resin type (microethylene) | | 6.4 |

According to further principles of the invention, at least a portion of the glass fibers which are used to reinforce the resin are deposited as continuous strands running longitudinally of the mandrel surface. This is accomplished in the embodiment shown in FIG. 1 by an annular frame 36 which surrounds the mandrel 10 and which is mounted on rollers and rotated at the same speed as is the mandrel 10. A plurality of beams 38 of continuous strands are mounted on the frame 36 so that the beams rotate with the frame. The continuous strands from the beams 38 are embedded in the resin so that the longitudinal movement of the mandrel and envelope uncoil the continuous strands from the beams 38 to deposit the strands longitudinally of the envelope 40. Additional resin and glass fiber mat, or strands, are wrapped spirally around the strands from the beams 38. Thereafter a further separation film 42 is wound over the top of the resin and fibers for reasons which will later be apparent.

The gelling agent, which in the present instance is an alkaline earth metal oxide, is reacted with the polyester resin at generally room temperature to link the molecules of the resin into a linear chain having thermoplastic properties. This reaction may proceed to some extent before the material leaves the mandrel, but in most instances this reaction will not have proceeded to an appreciable extent prior to the storage of the material, as will later be described. The envelope 40 is moved off of the mandrel over an envelope support ring 44 to a region where it is unsupported and then to roll producing apparatus 46 which will now be described.

The roll producing apparatus 46 comprises a pair of axially extending arms 48 which are connected by a transverse member 50 having an axially extending stub shaft 52 projecting outwardly therefrom. The stub shaft 52 is journaled in a pillow block 54 that is affixed to the bottom of a transverse overhead eyebeam 56 which supports the entire roll producing apparatus. A two-speed electric motor 58 that is mounted on top of the eyebeam drives the stub shaft 52 by means of a pair of sprockets 60 and 62 and drive chain 64. A pair of spaced apart rolls 66 are suitably journaled on the arms 48 adjacent to the mandrel 10 and another pair of spaced apart rolls 68 are mounted on the arms intermediate the rolls 66 and the transverse member 50. The envelope 40 proceeds from the mandrel 10 to between the rolls 66 and 68, and is then coiled into a roll by envelope winding apparatus 70.

The envelope winding apparatus 70 comprises a pair of axially aligned stub shafts 72 and 74 which are respectively journaled in pillow blocks 76 and 78 that are affixed to the bottom of opposite arms 48. The inner ends of the stub shafts 72 and 74 are provided with generally U shaped hubs 80 each of which have a rectangularly shaped slot 82 in their ends which face each other. Each slot 82 opens into one side face of the hub, such that the rectangular shaped slots can receive the ends of a square shaft 84 when slid endwise therein. A pin 86 is inserted through suitable openings in the side walls of each hub to hold the shaft 84 in place. Thereafter the severed end of the envelope 40 is placed on top of the square shaft 84 and a hold down bar 88 is placed on top of the envelope with its opposite ends received in the rectangular slots 82 in the hubs 80. Thereafter another retaining pin 90 is inserted in openings in the side walls of each hub 80 to hold the hold down bar in place.

Figure 2:
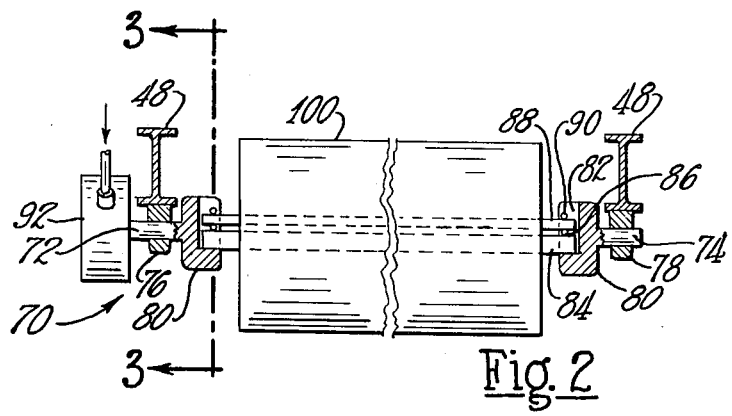
FIG. 2 is a sectional view taken approximately on the line 2—2 of FIG. 1.

The hub 80 on the left side as seen in FIG. 2 is driven by an air motor 92. The air supply to the motor 92 passes through a modulating control valve 94 which is actuated by a lever 96 adopted to be engaged by the envelope as it leaves the mandrel 10. The excessive sag of the envelope 40 causes the valve to open beyond a normal amount to supply additional air pressure to the air motor 92 and thereby increase its speed to take up the excessive slack. A bypass valve 98 is normally set to provide sufficient air pressure to the air motor 92 to rotate shaft 84 and hold a slight tension on the envelope leaving the mandrel. If for some reason slack should develop, the lever 96 is moved to open modulating valve 94 and supply additional air pressure to the motor causing the motor 92 to speed up and remove the slack.

After the envelope has been coiled into a package 100 of the desired diameter, the electric motor 58 is speeded up and then stopped to advance the roll 100 ahead of the mandrel 10. The transverse member 50 is stopped in a horizontal position and the hubs 80 are stopped with the rectangular slots 82 opening upwardly of the hubs. A sling from an overhead conveyer is wrapped around the opposite ends of the rectangular square shaft 84, the pins 86 and 90 are removed from the hubs 80. The overhead conveyer is raised to lift the package 100 and remove the slack in the flattened envelope. Another square shaft 84 is slipped into the rectangular slots 82, the envelope 40 is severed, and the package 100 is lifted clear of the roll producing apparatus 46. The end of the envelope that is attached to the mandrel is positioned over the new square shaft 84 and another hold down bar 88 is placed over the envelope. The ends of the hold down bar 86 are positioned in slots 82 and the retaining pins 86 and 90 are installed. Thereafter the bypass valve 98 is opened and the motor 58 started at a fast speed to bring the shaft 84 in phase with the rotation of the mandrel 10. Alternatively the mandrel 10 can be stopped, the finished package 100 removed, and a new package 100 started.

It will now be seen that an envelope is prepared by applying a separation film to the surface of a mandrel, following which a glass fiber mat and resin are deposited onto the mandrel. If desired, longitudinally extending glass strands may be embedded in the resin as by beams 38 carried by an annular frame 36 that is rotated in unison with the mandrel. The build up of resin and fibers is completed by applying additional resin and strand which preferably include circumferentially wound strands, and another separation film is applied over the top thereof. In some instances the longitudinal fibers can be those of a scrim wherein the longitudinal fibers are spaced apart and held by transverse fibers fixed thereto to form a web. Where a scrim is used as the beam 38, a cylindrical wrap may not be necessary over the top thereof. The envelope so produced has sufficient longitudinal strength to support its weight when it is removed from the mandrel and is coiled into a package. Either during this operation, or while in the coiled package, the molecules of the resin are linked linearly into a thermoplastic state.

Figure 4:
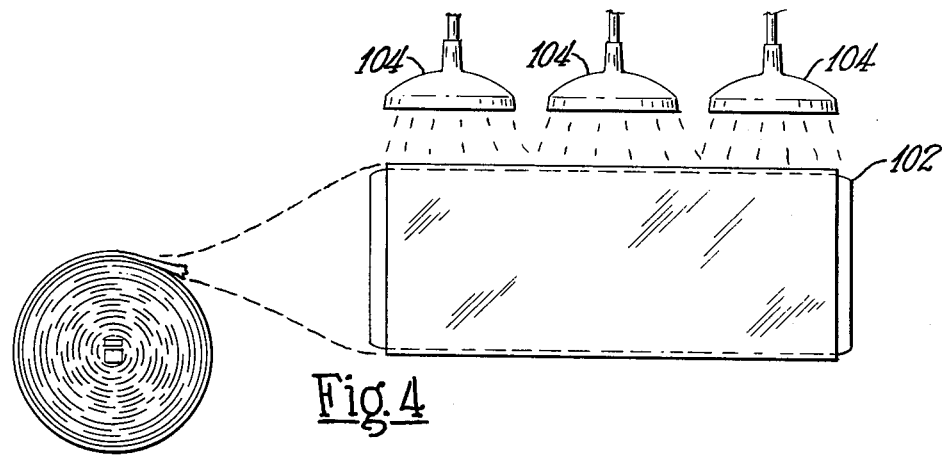
FIG. 4 is a schematic view of the envelope of the invention being shaped over a mold of generally square cross section and cured by heat lamps.
Figure 5:
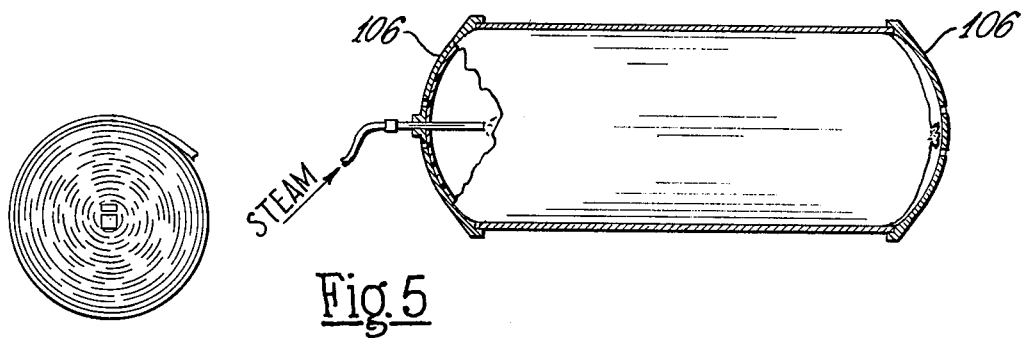
FIG. 5 is a schematic view of the envelope inserted in a pipe and expanded and heated with steam to form a lining for the pipe.

The coiled packages 100 are then transported to a location where they are to be used, and the flattened envelope is uncoiled from the package and is pulled onto a form 102 of desired shape, as for example a square shape with rounded corners. The separation film may or may not be removed while held in the desired shape. Heat, as by lamps 104 is applied to activate the free radical catalyst and cause the molecules of the resin to be cross-linked into a thermoset condition as shown in FIG. 4. The materials from package 100 can also be used to line vessels of any cross section, including pipes of circular cross section as shown in FIG. 5. The envelope is fed into a pipe, the ends of the envelope are sealed and supported as at 106, and pressure is applied internally to expand the envelope into engagement with the side walls of the pipe being lined. Thereafter, the temperature of the envelope is raised to activate the free radical catalyst to cure the envelope insitu as a lining of the pipe.

While the invention has been described in considerable detail, I do not wish to be limited to the particular embodiments shown and described, and it is my intention to cover hereby all novel adapations, modifications, and arrangements thereof which come within the practice of those skilled in the art to which the invention relates.

I claim:

1. A method of producing sheet molding compound for use in making glass fiber reinforced molded articles, comprising: depositing a binder forming material and glass fiber reinforcement onto a generally cylindrical surface having a longitudinally extending axis of revolution while the surface is both revolved about its longitudinal axis and is moved longitudinally of said axis to form a revolving flexible envelope, moving the revolving flexible envelope axially off of said generally cylindrical surface while it is revolving, passing the flexible envelope between opposing rollers extending transversely of said longitudinal axis to collapse said envelope while said envelope is revolving, supporting means for rolling the collapsed envelope into a roll transversely to the longitudinal axis of said generally cylindrical surface, and revolving said rollers and last mentioned means end for end transversely of said longitudinal axis generally in synchronism with said generally cylindrical surface while actuating said last mentioned means to produce a roll of said collapsed envelope.

2. The method of claim 1 including the steps of: sensing the position of said envelope between said generally cylindrical surface and the point where it is collapsed by said opposing rollers, and controlling the rate of actuation of said last mentioned means in accordance with the position of said envelope that is sensed.

3. The method of claim 1 wherein said binder forming material contains an unsaturated polyester resin, an alkaline earth oxide containing material to link the resin molecules into a linear generally flexible solid state at a low temperature, and a free radical catalyst to cross link the resin molecules at a higher temperature.

4. The method of claim 3 wherein said glass fibers include fibers running longitudinally of the cylindrical surface and having a length which spans unsupported distances during the operations recited.

5. The method of claim 1 wherein said glass fibers include fibers running longitudinally of said generally cylindrical surface and have a length which spans the operations recited from the time of leaving the generally cylindrical surface until the envelope is supported by the opposing rollers.

6. The method of claim 5 wherein said fibers running longitudinally of the cylindrical surface are added to the cylindrical surface as a scrim.

7. A method of producing glass fiber reinforced plastic objects having a polygonal cross section and comprising: depositing a binder forming material and glass fibers onto the surface of a mandrel while the surface both revolves about its longitudinal axis and moves longitudinally of said axis to form a revolving flexible envelope, removing the revolving flexible envelope axially off of the surface of the mandrel while it is revolving, passing the flexible envelope between opposing rollers extending transversely of said longitudinal axis to collapse said envelope while said envelope is revolving, supporting means for rolling the collapsed shell into a roll transversely to the longitudinal axis of said mandrel, cutting the roll free, moving the roll to a form having an exterior surface of polygonal cross section, expanding the collapsed envelope over said form, and causing said binder forming material of said envelope to harden and assume the configuration of said form.

8. The apparatus for making a flattened tube of glass fibers embedded in hardenable matrix forming material, comprising: a generally cylindrical form having a longitudinal axis of rotation, means for rotating said form about its longitudinal axis of rotation, means for winding glass fiber reinforcements onto said form to form a collapsible shell while it revolves about its longitudinal axis, means for applying resin to said reinforcements, means for moving said shell axially off of said form, a pair of opposing rollers extending generally transversely of said longitudinal axis of rotation and spaced axially from said form for collapsing said shell when drawn therebetween, package producing means for rolling the collapsed shell into a transportable roll of said collapsed shell, and means rotating said transversely extending opposing rollers and said package producing means at generally right angles to said longitudinal axis generally in synchronism with said form to produce said package while said form is rotating.

9. The apparatus of claim 8 including: means for distributing generally continuous strands generally longitudinally of said cylindrical form.

10. The apparatus of claim 9 wherein said means for distributing generally continuous strands longitudinally of said form comprises: an annular frame surrounding said form, a plurality of packages of glass fiber strands on said frame with the strands in position for contacting binder deposited on said form, and means for rotating said frame at generally the same speed as said form.

* * * * *